United States Patent [19]

Fujioka et al.

[11] 4,405,679

[45] Sep. 20, 1983

[54] COATED SHAPED ARTICLE OF POLYCARBONATE TYPE RESIN

[75] Inventors: Akira Fujioka, Osaka; Kazuo Sakiyama, Ibaraki; Akio Takigawa; Motoaki Yoshida, both of Nishinomiya, all of Japan

[73] Assignees: Nippon Sheet Glass Co. Ltd.; Sumitomo Chemical Company, Limited, both of Osaka, Japan

[21] Appl. No.: 222,577

[22] Filed: Jan. 5, 1981

[30] Foreign Application Priority Data

Jan. 10, 1980 [JP] Japan .................................. 55-1531

[51] Int. Cl.³ ........................ B32B 27/30; B32B 27/36
[52] U.S. Cl. .................................. 428/216; 427/412.1; 427/412.5; 427/419.8; 427/387; 428/215; 428/323; 428/331; 428/334; 428/335; 428/336; 428/412; 428/413; 428/447; 428/451; 428/522
[58] Field of Search ............... 428/412, 413, 451, 522, 428/215, 216, 334–336, 447, 331, 323; 427/387, 412.1, 412.5, 419.8

[56] References Cited

U.S. PATENT DOCUMENTS

| 4,027,073 | 5/1977 | Clark | 428/412 |
|---|---|---|---|
| 4,073,967 | 2/1978 | Sanduig | 428/412 |
| 4,082,894 | 4/1978 | Yoshida | 428/412 |
| 4,210,699 | 7/1980 | Schroeter | 428/451 |
| 4,211,823 | 7/1980 | Suzuki | 428/412 |
| 4,239,798 | 12/1980 | Schroeter | 428/412 |
| 4,284,685 | 8/1981 | Olson | 428/412 |
| 4,332,857 | 6/1982 | Taniyama | 428/412 |

FOREIGN PATENT DOCUMENTS 56-72954  6/1981  Japan .................................. 428/447

Primary Examiner—Ellis P. Robinson
Attorney, Agent, or Firm—Gordon W. Hueschen

[57] ABSTRACT

A coated shaped article of a polycarbonate type resin of improved abrasion resistance, which comprises: (I) a shaped substrate of a polycarbonate type resin, (II) an undercoat layer applied to and cured on said substrate, and (III) an overcoat layer applied to and cured on the undercoat layer, which overcoat is formed of a composition containing: (A) at least one hydrolyzate selected from the group of epoxy group-containing silicon compounds, (B) at least one member selected from the group consisting of hydrolyzates of organic silicon compounds colloidal silica and organic titanium compounds, and (C) a curing catalyst.

18 Claims, No Drawings

COATED SHAPED ARTICLE OF POLYCARBONATE TYPE RESIN

BACKGROUND OF THE INVENTION

1. Field of the Invention

This invention relates to a coated shaped article of a polycarbonate type resin. More particularly, this invention relates to a coated shaped article of a polycarbonate type resin excelling in abrasion resistance, formed by coating a shaped substrate of a polycarbonate type resin with an undercoating paint highly adhesive to the polycarbonate type resin, allowing the applied undercoat to cure, subsequently coating the undercoated shaped substrate with an overcoating paint containing a silicon type resin and allowing the applied overcoat to cure.

2. Description of the Prior Arts

Generally, polycarbonate type resins excel in impact resistance and transparency and, therefore, are widely used as transparent plastic materials. They nevertheless have a disadvantage that, because of deficiency in resistance to abrasion and solvents, they tend to sustain scratches on the surface and yield to the action of an organic solvent. To remedy this fault, various methods for coating such polycarbonate type resins have been proposed. None of these methods, however, have provided any satisfactory remedy.

For example, combinations of trialkoxysilanes such as methyl trialkoxysilanes and phenyl trialkoxysilanes with tetraalkoxysilanes such as ethyl silicate and butyl silicate and mixtures of such combinations with other resin paints have been known as coating compositions. None of them have proved completely satisfactory in such properties as abrasion resistance, adhesiveness, hot water resistance, thermal resistance and weather resistance. Japanese Patent Publications No. 15,743/1978 and No. 35,589/1978 disclose coating compositions which comprise epoxy group-containing alkoxysilanes and curing catalysts such as $BF_3$, $BF_3$ etherate and other Lewis acids, complexes of such acids, HCl, HBr, HI, $HNO_3$, $HClO_3$, $H_3PO_4$ and other Bronsted acids. These coating compositions have a short pot life and exhibit deficient adhesiveness to polycarbonate type substrates. U.S. Pat. No. 3,986,997 discloses a coating composition comprising coloidal silica and hydrolyzate of methyltri methoxy silane as a main component. Although the cured coating film has sufficient hardness, it has poor flexibility, and it is very difficult to obtain good adhesiveness to the polycarbonate type resin substrate. Japanese Laid-Open Patent Publication No. 111,336/1978 discloses coating compositions comprising one or more of mixtures selected from compounds containing epoxy group and silanol group and/or siloxane group and fine divided silica having a particle diameter of from 1 to 100 milimicrons and an aluminum chelate compound, but the cured coated film has poor hardness and the hardness decreases by boiling, dipping into water and the like, and further, it exhibits poor adhesiveness to a bisphenol type polycarbonate substrate.

It is, therefore, an object of this invention to provide a coated shaped article of a polycarbonate type resin, the coat of which exhibits high resistance to abrasion, hot water, heat and weather conditions and offers improved adhesiveness to the substrate.

It is an another object of this invention to provide a process for producing the coated shaped article of the polycarbonate type resin.

SUMMARY OF THE INVENTION

The object described above is attained by a coated shaped article of a polycarbonate type resin of improved abrasion resistance, which comprises:

(I) a shaped substrate of a polycarbonate type resin, (II) an undercoat layer applied to and cured on said substrate mentioned above in a thickness of at least about 0.1 micron, which undercoat is formed of a composition containing a polymer selected from the group consisting of:

(i) a polymer having repeating structural units represented by the general formula (3):

wherein, $R^6$ and $R^7$ independently stand for a hydrogen atom or an alkyl group or carboxyl group of 1 to 5 carbon atoms and X for a side chain containing a carboxyl group, amino group or epoxy group, and (ii) a polymer having repeating structural units represented by the general formula (4):

wherein, $R^8$ and $R^9$ independently stand for a hydrogen atom or a lower alkyl group or carboxyl group and Y for a side chain containing a hydroxy group and repeating structural units represented by the general formula (5):

wherein, $R^{10}$ and $R^{11}$ independently stand for a hydrogen atom or a lower alkyl group or carboxyl group and Z for a side chain containing a carboxyl group, alkoxy-carbonyl group, amino group, substituted amino group, epoxy group or tetrahydro-furyl group, and (III) an overcoat layer applied to and cured on the undercoat layer mentioned above in a thickness of at least about 0.1 micron, which overcoat is formed of a composition containing as component:

(A) at least one hydrolyzate selected from the group of epoxy group-containing silicon compounds represented by the general formula (1):

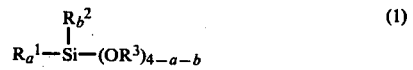

wherein, $R^1$ stands for an organic group containing an epoxy group, $R^2$ for a hydrogen atom or a hydrocarbon group of 1 to 6 carbon atoms or vinyl group, $R^3$ for a hydrocarbon group of 1 to 5 carbon atoms, an alkoxy-alkyl group or an acyl group of 1 to 4 carbon atoms, a for an integer of 1 to 3 and b for an integer of 0 to 2, providing that $a+b \leq 3$ is satisfied, as component (B) at least one member selected from the group consisting of hydrolyzates of organic silicon compounds represented by the general formula (2):

$$R_c^4\text{—Si—}(OR^5)_{4-c} \qquad (2)$$

wherein, $R^4$ stands for a hydrogen group of 1 to 6 carbon atoms, vinyl group, methacryloxy group, amino group, mercapto group or organic group containing fluorine or chlorine, $R^5$ for a hydrocarbon group of 1 to 5 carbon atoms, alkoxy-alkyl group or acyl group of 1 to 4 carbon atoms, and c for an integer of 0 to 3, colloidal silica and organic titanium compounds, and as component (C) a curing catalyst and wherein component (A) is used in an amount of 100 parts by weight (of solids, calculated as

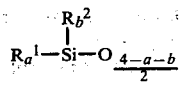
$$R_a^1\text{—Si—O}_{\frac{4-a-b}{2}}$$
with $R_b^2$ above Si and component (B) is used in an amount falling within the range of from 1 to 567 parts by weight (of solids, calculated as

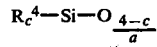
$$R_c^4\text{—Si—O}_{\frac{4-c}{a}}$$

in the case of an organic silicon compound of the general formula $SiO_2$ in the case of colloidal silica, or as

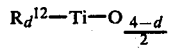
$$R_d^{12}\text{—Ti—O}_{\frac{4-d}{2}}$$

in the case of an organic titanium compound, wherein $R^{12}$ stands for an unhydrolyzed group containing no hydroxyl group and d for an integer of 1 to 4), said undercoating being of a thickness which promotes adhesion of the overcoating and said overcoating being of a thickness which gives satisfactory abrasion resistance and adhesion without cracking.

The coated shaped article can be prepared by a process which comprises:

coating a shaped substrate of a polycarbonate type resin with a composition containing a polymer selected from the group consisting of:

(i) a polymer having repeating structural units represented by the general formula (3), and
(ii) a polymer having repeating structural units represented by the general formula (4) and repeating structural units by the general formula (5) as an undercoat layer in a thickness of at least about 1 micron and coating the thus undercoated substrate with a composition containing:
(A) at least one hydrolyzate selected from the group of epoxy group-containing silicon compounds represented by the general formula (1),
(B) at least one member selected from the group consisting of hydrolyzates of organic compounds represented by the general formula (2), colloidal silica and organic titanium compounds and
(C) a curing catalyst as an overcoat layer, in a thickness of at least about 1 micron, and wherein component (A) is used in an amount of 100 parts by weight (of solids, calculated as

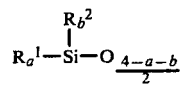
$$R_a^1\text{—Si—O}_{\frac{4-a-b}{2}}$$
with $R_b^2$ above Si and component (B) is used in an amount falling within the range of from 1 to 567 parts by weight (of solids, calculated as

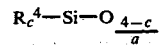
$$R_c^4\text{—Si—O}_{\frac{4-c}{a}}$$

in the case of an organic silicon compound of the general formula (2), $SiO_2$ in the case of colloidal silica, or as

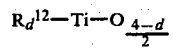
$$R_d^{12}\text{—Ti—O}_{\frac{4-d}{2}}$$

in the case of an organic titanium compound, wherein $R^{12}$ stands for an unhydrolyzed group containing no hydroxyl group and d for an integer of 1 to 4), said undercoating being of a thickness which promotes adhesion of the overcoating and said overcoating being of a thickness which gives satisfactory abrasion resistance and adhesion without cracking.

PREFERRED EMBODIMENT OF THE INVENTION

Examples of epoxy group-containing silicon compounds which are usable in the present invention as the component (A) represented by the general formula (1) are shown below. Typical silicon compounds containing one glycidoxy group are as follows:

Glycidoxymethyl trimethoxysilane
Glycidoxymethyl triethoxysilane
β-Glycidoxyethyl trimethoxysilane
β-Glycidoxyethyl triethoxysilane
γ-Glycidoxypropyl trimethoxysilane
γ-Glycidoxypropyl triethoxysilane
γ-Glycidoxypropyl tri(methoxyethoxy)silane
γ-Glycidoxypropyl triacetoxysilane
δ-Glycidoxybutyl trimethoxysilane
δ-Glycidoxybutyl triethoxysilane
Glycidoxymethyl dimethoxysilane
Glycidoxymethyl(methyl) dimethoxysilane
Glycidoxymethyl(ethyl) dimethoxysilane
Glycidoxymethyl(phenyl) dimethoxysilane
Glycidoxymethyl(vinyl) dimethoxysilane
Glycidoxymethyl(dimethyl) methoxysilane
β-Glycidoxyethyl(methyl) dimethoxysilane
β-Glycidoxyethyl(ethyl) dimethoxysilane
β-Glycidoxyethyl(dimethyl) methoxysilane
γ-Glycidoxypropyl(methyl) dimethoxysilane
γ-Glycidoxypropyl(ethyl) dimethoxysilane
γ-Glycidoxypropyl(dimethyl) methoxysilane
δ-Glycidoxybutyl(methyl) dimethoxysilane
δ-Glycidoxybutyl(ethyl) dimethoxysilane
δ-Glycidoxybutyl(dimethyl) methoxysilane Typical silicon compounds containing two or three glycidoxy groups are as follows:

Bis-(glycidoxymethyl) dimethoxysilane
Bis-(glycidoxymethyl) diethoxysilane
Bis-(glycidoxyethyl) dimethoxysilane
Bis-(glycidoxyethyl) diethoxysilane
Bis-(glycidoxypropyl) dimethoxysilane
Bis-(glycidoxypropyl) diethoxysilane
Tris-(glycidoxymethyl) methoxysilane
Tris-(glycidoxymethyl) ethoxysilane
Tris-(glycidoxyethyl) methoxysilane
Tris-(glycidoxyethyl) ethoxysilane
Tris-(glycidoxypropyl) methoxysilane
Tris-(glycidoxypropyl) ethoxysilane Typical glycidyl group-containing silicon compounds are as follows:

Glycidylmethyl trimethoxysilane
Glycidylmethyl triethoxysilane
β-Glycidylethyl trimethoxysilane
β-Glycidylethyl triethoxysilane
β-Glycidylpropyl trimethoxysilane
γ-Glycidylpropyl triethoxysilane
γ-Glycidylpropyl tri(methoxyethoxy)silane
γ-Glycidylpropyl triacetoxysilane Typical alicyclic epoxy group-containing silicon compounds are as follows:

3,4-Epoxycyclohexylmethyl trimethoxysilane
3,4-Epoxycyclohexylmethyl triethoxysilane
3,4-Epoxycyclohexylethyl trimethoxysilane
3,4-Epoxycyclohexylpropyl trimethoxysilane
3,4-Epoxycyclohexylbutyl trimethoxysilane Examples of organic silicon compounds which are usable in the present invention as one of the group of components (B) represented by the general formula (2) are trimethyl methoxysilane, dimethyl dimethoxysilane, methyl trimethoxysilane, tetraethoxysilane, phenyl trimethoxysilane, phenylmethyl dimethoxysilane, vinyl triethoxysilane, vinyl-tris(β-methoxy ethoxy)silane, vinyl triacetoxysilane, γ-methacryloxypropyl trimethoxysilane, γ-aminopropyl triethoxysilane, N-β-(aminoethyl) γ-aminopropyl trimethoxysilane, N-bis(β-hydroxyethyl)-γ-aminopropyl triethoxysilane, N-β-(aminoethyl)-γ-aminopropyl (methyl) dimethoxysilane, γ-chloropropyl trimethoxysilane, γ-mercaptopropyl trimethoxysilane and 3,3,3-trifluoropropyl trimethoxysilane. These compounds may be used either independently of one another or in the form of a mixture of two or more members. Of the members of the group of components (B), the colloidal silica is a colloid solution having an ultra-fine powder of silicic anhydride of the stated particle diameter dispersed in a dispersant such as, for example, water or an alcoholic dispersant, and preferably has a particle diameter within the range of from 1 to 100 milimicrons. It is produced by a known method and is available on the market.

Examples of organic titanium compounds which are usable in the present invention as one of the group of components (B) include alkoxy titanates such as tetrabutyl litanate, tetraisopropyl titanate and tetrakis(2-ethylhexyl) titanate and alkoxy titanate polymers as polycondensates thereof; titanium acylates such as tetrastearyl titanate and tributoxymonostearyl titanate; titanium chelates such as diisopropoxy-bis(acetyl-acetone) titanate, dibutoxy-bis(triethanolamine) titanate, dihydroxy-bis(lactic acid) titanate and tetraoxtylene glycol titanate and hydrolyzates thereof.

Use of one or more members from the group of components (B) mentioned above in conjunction with the component (A) imparts improved weatherability or dyeability of the produced article. Combined use of the hydrolyzate of an organic silicon compound represented by the general formula (2) and a colloidal silica as two members of the group of components (B) in conjunction with the component (A) enables the formed article to exhibit improved appearance and rigidity after a weather test. When, of the group of components (B), use of at least one member selected from the group consisting colloidal silica and organic titanium compounds in conjunction with the component (A) enables the cured coat on the produced article to be easily dyed by an ordinary method using a disperse dye.

One or more hydrolyzates selected from the group of epoxy group-containing silicon compounds represented by the aforementioned general formula (1) to be used as the component (A) and one or more hydrolyzates selected from the group of organic silicon compounds represented by the aforementioned general formula (2) to be used as the component (B) respectively in the present invention contain hydroxy groups resulting from partial or whole substitution of alkoxy groups, alkoxy-alkoxy groups or acyloxy groups present in the silicon compounds and natural condensates formed partially between the hydroxyl groups produced by the substitution. These hydrolyzates are obtained by hydrolyzing the corresponding compounds in a mixed solvent such as is formed of water with an alcohol, in the presence of an acid as known well in the art. When the silicon compounds represented by the aforementioned general formulas (1) and (2) are used in their unhydrolyzed form in this invention, the cured coat on the produced article yields to the phenomenon of blushing and exhibits insufficient abrasion resistance. When the silicon compound and titanium compound represented by the general formulas (1) and (2) are to be used in the form of hydrolyzates, better results are obtained more often when they are mixed and simultaneously subjected to hydrolysis than otherwise.

The ratio of the amount of the component (A) to that of the component (B) to be used in this invention is such that the total amount of the component (B) falls within the range of from 1 to 567 parts by weight [in solids content calculated as

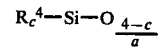

in the case of an organic silicon compound represented by the general formula (2), in solids content calculated as $SiO_2$ in the case of colloidal silica, or in solids content calculated as

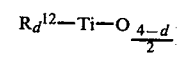

(where, $R^{12}$ stands for an unhydrolyzed group containing no hydroxy group and d for an integer of 1 to 4)] based on the total of 100 parts by weight of the component (A) [in solids content calculated as

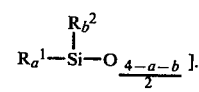

In the composition particularly desirable for the purpose of improving the weather resistance, the amount of the hydrolyzate of the organic silicon compound of the general formula (2) falls within the range of from 56 to 550 parts by weight and that of the colloidal silica of a particle diameter of 1 to 100 mμ within the range of from 4 to 334 parts, with the total amount of the component (B) falling within the range of from 60 to 567 parts, based on 100 parts by weight of the total amount of the component (A). In the preferred composition, the amount of the hydrolyzate of the organic silicon compound represented by the general formula (2) falls within the range of from 105 to 430 parts by weight and that of the colloidal silica within the range of from 16 to 200 parts, with the total amount of the component (B) falling within the range of from 121 to 473 parts by weight, based on 100 parts by weight of the total amount of the component (A). In the composition which provides easy dyeing of the cured coat, the total amount of the component (B) comprising one or more members selected from the group consisting of colloidal silica and organic titanium compounds falls within the range of from 1 to 150 parts by weight, based on 100 parts by weight of the amount of the component (A). Preferably, the total amount of the component (B) comprising one or more members selected from the group consisting of colloidal silica and organic titanium compounds falls within the range of from 3 to 70 parts by weight, based on 100 parts by weight of the component (A). When the total amount of the component (B) is less than 1 part by weight, the effect of the addition of this component falls short of the expected level. When it exceeds 567 parts by weight, the coat exhibits very poor adhesiveness to the substrate and tends to sustain cracks easily.

Examples of curing catalysts which are usable in the coating composition for application as the overcoat to the substrate in the present invention include ammonium perchlorate, ammonium nitrate, ammonium chloride, ammonium sulphate, perchloric acid, hydrochloric acid, nitric acid, phosphoric acid, sulfuric acid, sulfonic acid, para-toluene sulfonic acid, boron trifluoride and complexes thereof with electron donors; Lewis acids such as $SnCl_4$, $ZnCl_3$, $FeCl_3$, $AlCl_3$, $SbCl_5$ and $TiCl_4$ and complexes thereof; organic metal salts such as sodium acetate, zinc naphthenate, cobalt naphthenate, zinc octylate and tin octylate; metal salts of borofluoride such as zinc borofluoride and tin borofluoride; organic esters of boric acid such as ethyl borate and methyl borate; alkalis such as sodium hydroxide and potassium hydroxide; titanates such as tetrabutoxy titanate and tetraisopropoxy titanate; metal acetyl acetonates such as chromium acetyl acetonate, titanyl acetyl acetonate, aluminum acetyl acetonate, cobalt acetyl acetonate and nickel acetyl acetonate; and amines such as n-butylamine, di-n-butylamine, tri-n-butylamine, guanidine, biguanidene and imidazol.

Of the various curing catalysts enumerated above, ammonium perchlorate which is one of the latent catalysts proves optimum as a desirable catalyst capable of imparting a long pot life, high hardness of the coated film and high adhesiveness to the coating liquid.

As the curing catalyst to be included in the overcoating composition in the present invention, either one member or a mixture of two or more members selected from the plurality of groups of curing catalysts indicated above may be used.

The amount of the curing catalyst is within the range of from 0.05 to 10% by weight, preferably from 0.1 to 5% by weight, based on the solids content of the overcoating composition.

Examples of solvents which are compatible with the coating composition include alcohols, ketones, esters, ethers, cellosolves, halides, carboxylates and aromatic compounds. One member or a mixture of two or more members selected from the group of solvents mentioned above may be used. It is particularly desirable to use one member or a mixture of two or more members selected from the group consisting of lower alcohols such as methanol, ethanol, propanol, isopropanol and butanol; cellosolves such as methyl cellosolve, ethyl cellosolve and butyl cellosolve; lower alkyl carboxylic acids such as formic acid, acetic acid and propionic acid; aromatic compounds such as toluene and xylene; and esters such as ethyl acetate and butyl acetate.

Optionally for the purpose of providing a smooth overcoat, a flow control agent made of a block copolymer of an alkylene oxide and dimethyl siloxane such as, for example, NUC Silicone Y-7006 (a proprietary product) from Nippon Unicar Company, may be incorporated in the coating composition. The amount of the flow control agent to be added need not be very large to manifest its effect and, generally, suffices in the range of from 0.01 to 5% by weight, preferably form 0.03 to 3% by weight, based on the total weight of the coating composition. Optionally, an antioxidant, an ultraviolet ray absorbent, etc. may be incorporated in small amounts.

The overcoating of a shaped substrate of polycarbonate type resin with the overcoating composition is accomplished by any of the ordinary coating methods such as the immersion method, the spray method, the roller coating method and the flow coating method, i.e. by applying the overcoating composition to the substrate on which the undercoating composition to be described more fully afterward has been deposited and cured in advance, then treating to cure the overcoat at a temperature not less than 70° C. and not more than the deforming temperature of the substrate (130° C., for example) for a period of from 20 minutes to 5 hours. Consequently, the shaped substrate acquires a coat excelling in abrasion resistance, adhesiveness, hot water resistance and weather resistance.

The overcoat thus formed is desired to have a thickness within the range of from 1 to 30 microns, preferably from 3 to 15 microns. When the thickness is substantially less than 1 micron, the coat offers no sufficient abrasion resistance. When it exceeds 30 microns, the coat tends to sustain cracks.

Now the undercoat layer to be interposed between the aforementioned overcoat layer and the shaped substrate of polycarbonate type resin for the purpose of enhancing the adhesiveness of the overcoat to the substrate will be described. The undercoat composition which is particularly suitable for use on the shaped substrate of polycarbonate type resin is a paint which is preponderantly formed of (i) a polymer having repeating structural units represented by the general formula (3):

wherein, $R^6$ and $R^7$ independently stand for a hydrogen atom or a lower alkyl group or carboxyl group and X for a side chain containing a carboxyl group, amino group or epoxy group and (ii) a polymer having repeating structural units represented by the general formula (4):

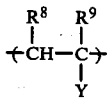

wherein, $R^8$ and $R^9$ independently stand for a hydrogen atom or lower alkyl group of 1 to 5 carbon atoms or carboxyl group and y for a side chain containing a hydroxyl group and repeating structural units represented by the general formula (5):

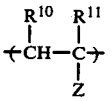

wherein, $R^{10}$ and $R^{11}$ independently stand for a hydrogen atom and Z for a side chain containing a carboxyl group, alkoxycarbonyl group, amino group, substituted amino group, epoxy group or tetrahydrofuryl group.

The aforementioned polymer (i) contains the repeating structural units represented by the general formula (3) in an amount of at least 5 mol%, preferably in an amount within the range of from 10 to 100 mol%. The polymer (ii) is desired to contain each of the repeating structural units of the general formulas (4) and (5) in an amount of at least 2.5 mol%, preferably in an amount within the range of from 5 to 90 mol%.

The polymer (i) of the aforementioned description can easily be prepared by using one member of the group of vinyl monomers enumerated below, either alone or in the form of a copolymer with some other monomer copolymerizable therewith. The vinyl monomers mentioned above are acrylic acid, methacrylic acid, crotonic acid, vinyl-acetic acid, maleic acid, itaconic acid, aminomethyl(meth)acrylate, (meth)acrylamide, crotonamide and glycidyl (meth)acrylate. These vinyl monomers may be used either independently of one another or in the form of a mixture of two or more members.

As other monomers which are copolymerizable with the vinyl monomers mentioned above and the vinyl monomers (iii) and (iv) to be described afterwards, there may be used any compounds satisfying the requirement that they should contain at least one ethylenically unsaturated bond within the molecular units. Examples of such compounds include olefins such as ethylene, diolefins such as butadiene, vinyl compounds such as vinyl chloride, vinylidene chloride and acrylonitrile, and esters of acrylic acid or methacrylic acid such as methyl(meth)acrylate. These monomers may be used either independently of one another or in the form of a mixture of two or more members. The polymer (i) may be used solely or in combination with one or more as undercoat.

The polymer (ii) of the aforementioned description can be prepared by copolymerizing the vinyl monomer (iii) and the vinyl monomer (iv) to be described afterwards, optionally in conjunction with some other monomer which is copolymerizable with the two vinyl monomers mentioned above. Examples of the vinyl monomer (iii) mentioned above include allyl alcohol; N-hydroxymethyl(meth)acrylamide, N-(2-hydroxyethyl)(meth)acrylamide, N,N-dihydroxymethyl(meth)acrylamide, N,N-di(2-hydroxyethyl)(meth)acrylamide; 2-hydroxyethyl(meth)acrylate, 1,4-butylene glycol mono(meth)acrylate, glycerol mono(meth)acrylate, hydroxyallyl methacrylate, polyethylene glycol mono(meth)acrlate, polypropylene glycol mono(meth)acrylate; hydroxymethyl aminomethyl(meth)acrylate, 2-hydroxyethyl aminomethyl(meth)acrylate, 2-(2-hydroxyethylamino) ethyl(meth)acrylate, N,N-di(hydroxymethyl) aminomethyl(meth)acrylate and N,N-di(2-hydroxyethyl) aminomethyl(meth)acrylate. These vinyl monomers may be used either independently of one another or in the form of a mixture of two or more members.

Example of the vinyl monomer (iv) mentioned include acrylic acid, methacrylic acid, crotonic acid, vinyl-acetic acid, maleic acid, itaconic acid; methyl(metho)acrylate, ethyl(meth)acrylate; (meth)acrylamide, crotonamide; N-methyl(meth)acrylamide, N-ethyl(meth)acrylamide, N-propyl(meth)acrylamide, N-butyl(meth)acrylamide, N-tert-butyl(meth)acrylamide, N,N-dimethyl(meth)acrylamide, N,N-diethyl(meth)acrylamide, N,N-dipropyl(meth)acrylamide, N,N-dibutyl(meth)acrylamide, N-butoxymethyl(meth)acrylamide, N-isobutoxymethyl(meth)acrylamide, 2-(N-methylamino)-ethyl(meth)acrylate, 2-(diethylamino)-ethyl(meth)acrylate, 2-(n,N-dimethylamino)-ethyl(meth)acrylate, 2-(N,N-diethylaminoethyl)(meth)acrylate, 2-(N,N-dibutylamino)-ethyl(meth)acrylate, 3-(N,N-diethylamino)-propyl(meth)acrylate, 2-(N,N-dibutylamino)-propyl(meth)acrylate, 3-N,N-dibutylamino)-propyl(meth)acrylate; (meth)acryl glycidyl ether, allyl glycidyl ether, glycidyl(meth)acrylate, glycidyl crotonate; and tetrahydrofurfuryl(meth)acrylate. These vinyl monomers (iv) may be used either independently of one another or in the form of a mixture of two or more members. The polymer (ii) may be used solely or in combination with one or more as undercoat.

The aforementioned undercoating composition is not always required to incorporate a cross-linking agent. When the overcoat is applied to the undercoat, there is a possibility that the organic solvent contained in the overcoat will pass into the undercoat even to an extent of notably degrading the adhesiveness of the overcoat. To preclude this possibility, therefore, it is desirable that the undercoat should contain a cross-linking agent enough to intercept the otherwise possible invasion of the organic solvent. Examples of cross-linking agents which are usable in the undercoat composition include polyhydric alcohols such as 1,4-butane diol, glycerin, and polyethylene glycol; melamines such as methylol melamine and alkyl-etherified methylol melamines; polyfunctional epoxy compounds such as ethylene glycol diglycidyl ether, glycerol polyglycidyl ether; alkoxysilane having epoxy group and hydrolyzate. Of these cross-linking agents, particularly desirable are alkyl-etherified methylol melamines such as hexa(methoxymethyl) melamine and hexa(butoxymethyl) melamine. These cross-linking agents may be used either independently of one another or in the form of a mixture of two or more members. When alkyl-etherified methylol melamines are used, the amount of the cross-linking agent to be used in this invention falls in the range of from 0.05 to 0.7 equivalent weight, preferably from 0.1 to 0.4 equivalent weight, based on one equivalent weight of the functional group (carboxylic group, amino group, substituted amino group, hydroxyl group, epoxy group or tetra-hydroxyl group) present in the aforementioned polymer (i) or polymer (ii).

Examples of the cross-linking catalyst usable with the cross-linking agent described above include hydrochloric acid, ammonium chloride, ammonium nitrate, ammonium thiocyanate and ammonium perchlorate. Generally, the amount of the cross-linking catalyst to be used falls within the range of from 0.05 to 1.0% by weight to the resin content. When polymers (i) and (ii) are used, the cross-linking agent is not always used.

The undercoating composition, immediately before use, is diluted to a concentration befitting the work of application to the substrate. Examples of diluents usable for this purpose include methanol and other alcohols, methyl cellosolve and other ethers, methylethyl ketone and other ketones, and methyl acetate and other esters. These diluents may be used either independently of one another or in the form of a mixture of two or more members. The extent of this dilution is desired to be such that the concentration of the aforementioned polymer (i) or polymer (ii) falls within the range of from 0.1 to 10% by weight, preferably from 0.5 to 5% by weight.

Optionally, the undercoating composition may contain therein an ordinary paint additive such as a flow control agent in a small amount.

The undercoat film can be formed on the shaped substrate of a polycarbonate type resin by preparing a composition consisting preponderantly of the aforementioned polymer (i) or polymer (ii) and optionally incorporating therein a cross-linking agent, a cross-linking catalyst, a diluent and a flow control agent, applying this composition to the surface of the shaped substrate, drying the resultant layer of composition and optionally treating the dried undercoat layer at a temperature lower than the temperature at which the shaped resin substrate is thermally deformed.

The thickness of the undercoat film is desired to fall within the range of from 0.1 to 1 micron. In consequence of the formation of this undercoat film, the hydroxyl group, carboxyl group or amino group present in the undercoat will react with the silicon components in the overcoat film to be subsequently superposed thereof, with the result that the overcoat layer will adhere with added fastness to the shaped substrate of a polycarbonate type resin through the medium of the undercoat film.

Examples of polycarbonate type resins usable in the present invention include polycarbonate of the kind disclosed in U.S. Pat. No. 3,305,520 and reported in Christopher and Fox: "Polycarbonates", pages 161–176 (1962) and diethylene glycol bis-allyl carbonate besides bis-phenol type polycarbonates such as 4,4'-isopropylidene diphenol carbonate. These polycarbonates are used in the form of shaped articles such as, for example, glasses lens, ski goggles, doors, automobile windows and partitions.

Optionally, the coated shaped articles of polycarbonate type resin may be produced as colored by dyeing their overcoat layers. The dyeing can be accomplished, for example, by preparing a dye bath having an ordinary disperse dye, a dispersant, a pH adjusting agent, etc. dissolved in water and keeping the shaped articles in the dye bath at a temperature within the range of from 85° to 95° C. for a period of from 5 to 30 minutes. Thus, there are obtained dyed articles which excel in abrasion resistance.

Now, the present invention will be described more specifically with reference to working examples. The invention is not limited by these examples. Wherever parts and percents are mentioned in the ensuing examples, they are meant as parts by weight and percents by weight respectively.

The properties of the coats which are to be indicated in the examples have been rated as shown below:

Abrasion resistance: A given sample was tested for resistance to scratches by having the surface rubbed with steel wool, #0000. This property was rated on the following scale.
A—No. scratch sustained even under strong rubbing.
B—Scratches sustained slightly under strong rubbing.
C—Scratches sustained even under weak rubbing.
Adhesiveness: This property was determined by the so-called cross cut tape test, i.e. by cutting 11 parallel lines each in two perpendicularly crossing directions with a knife at fixed intervals of 1 mm on the surface of the coat film of a given sample to product a total of 100 squares, applying an adhesive tape of cellophane to the cut squares, peeling the tape, and taking count of the squares on which the coat film remains fast. The adhesiveness was reported by the number so found.
Hot water resistance: This property was determined by keeping a given sample in boiling water for one hour and examining the coat film at the end of the standing.
Heat resistance: This property was determined by keeping a given sample in a hot-air furnace at a temperature of 100° C. for 100 hours and examining the coat film at the end of the standing.
Chemical resistance: This property was determined by keeping a given sample in a varying chemical indicated below at room temperature for 100 hours and examining the coat film at the end of the standing: 3% fulfuric acid, 1% sodium hydroxide, 95% ethanol, acetone, ethyl acetate, carbon tetrachloride, toluene, n-heptane and 10% sodium chloride solution.

EXAMPLE 1

An overcoating composition and an undercoating composition were prepared as shown below.

(1) Preparation of overcoating composition

In 49.0 parts of isopropyl alcohol, 86.4 parts of γ-glycidoxypropyl trimethoxysilane and 53.3 parts of methyl trimethoxysilane were dissolved. In the resultant solution, 61.4 parts of an aqueous 0.1 N hydrochloric acid solution was gradually added thereto and agitated at room temperature to effect hydrolysis of the silanes. Thereafter, the reaction mixture was left standing at room temperature for more than 20 hours to be fully aged. The solution thus obtained was colorless and transparent and was found to contain 24.5% of γ-glycidoxypropyl trimethoxysilane hydrolyzate calculated as

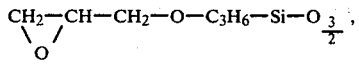

and 10.5% of methyl trimethoxysilane hydrolyzate calculated as $CH_3SiO_{3/2}$. An overcoating composition was produced by dissolving 88.4 parts of ethyl cellosolve, 0.42 part of ammonium perchlorate and a small amount of a flow control agent in 240 parts of the cohydrolyzate of γ-glycidoxypropyl trimethoxysilane and methyl trimethoxysilane obtained as described above.

(2) Preparation of undercoating composition

In 320 parts of ethyl cellosolve, 76 parts of 2-hydroxyethyl methacrylate, 4 parts of dimethylaminoethyl methacrylate and 0.4 part of azo-bis-isobutyronitrile were dissolved. The solution was stirred under the atmosphere of nitrogen at 90° C. for four hours to effect copolymerization. An undercoating composition (a) was obtained by adding 2.9 parts of hexa(methoxymethyl melamine, 0.18 part of ammonium perchlorate, 900 parts of ethyl cellosolve and a small amount of a flow control agent to 100 parts of the solution obtained as described above.

The undercoating composition prepared in (2) above was applied to a polycarbonate substrate which had been cleaned in advance and dried in a hot-air furnace at 130° C. for 20 minutes. Then, the overcoating composition prepared in (1) above was applied to the polycarbonate substrate which had been covered with the undercoat film (having a thickness of 0.3 micron), and then dried and cured in a hot-air furnace at 130° C. for 90 minutes. When the overcoat layer was cured, its thickness was 5 microns. The coated shaped article of polycarbonate resin thus obtained was transparent. The abrasion resistance was A, the adhesiveness was 100/100, and the hot water resistance and the heat resistance were good. Even after the test for hot water resistance, the abrasion resistance was A and the adhesiveness was 100/100. In all the chemicals, the product showed high resistance. After the test, it retained its good appearance intact.

EXAMPLE 2

In 76.3 parts of isopropyl alcohol, 98.8 parts of γ-glycidoxypropyl trimethoxysilane and 28.4 parts of dimethyl dimethoxysilane were dissolved. In the solution, 46.6 parts of an aqueous 0.1 N hydrochloric acid solution was gradually added and stirred at room temperature to effect hydrolysis. Thereafter, the mixture was left standing at room temperature for more than 20 hours to be fully aged. The resultant solution was colorless and transparent and was found to contain 28.0% of γ-glycidoxypropyl trimethoxysilane hydrolyzate calculated as

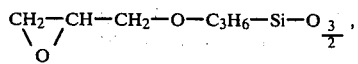

and 7.0% of dimethyl dimethoxysilane hydrolyzate calculated as $(CH_3)_2SiO$.

An overcoating composition was obtained by dissolving 88.4 parts of ethyl cellosolve, 0.42 part of ammonium perchlorate and a small amount of a flow control agent in 240 parts of the solution of cohydrolyzate of γ-glycidoxypropyl trimethoxysilane and dimethyl dimethoxysilane obtained as described above.

The overcoating composition obtained above was applied to a polycarbonate substrate which had been covered in advance with an undercoating composition as in Example 1 and then dried and cured in a hot-air furnace at 130° C. for 90 minutes.

The coated shaped article of polycarbonate resin was transparent. The abrasion resistance was A. The adhesiveness was 100/100 and the hot water resistance and the heat resistance were both good. Then after all these tests, the article retained its good appearance intact and the adhesiveness was invariably 100/100. After 500 hours of a sunshine weather meter test, the system of the present example using γ-glycidoxypropyl methoxysilane, one member of the group of components (A), and dimethyl dimethoxysilane, one member of the group of components (B), showed a better appearance than a system using γ-glycidoxypropyl trimethoxysilane alone.

EXAMPLE 3

In 43.9 parts of iso-propyl alcohol, 74.5 parts of γ-glycidoxypropyl trimethoxysilane, 53.5 parts of methyl trimethoxysilane and 14.3 parts of dimethyl dimethoxysilane were dissolved. In the resultant solution, 63.8 parts of an aqueous 0.1 N hydrochloric acid solution was gradually added and stirred at room temperature to effect hydrolysis. Thereafter, the resultant mixture was left standing at room temperature for more than 20 hours to be fully aged. The resultant solution was colorless and transparent. It was found to contain 21% of γ-glycidoxypropyl trimethoxysilane hydrolyzate calculated as

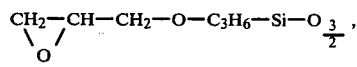

10.5% of methyl trimethoxysilane hydrolyzate calculated as $CH_3SiO_{3/2}$, and 3.5% of dimethyl dimethoxysilane hydrolyzate calculated as $(CH_3)SiO$.

An overcoating composition was obtained by dissolving 88.4 parts of ethyl cellosolve, 0.4 parts of ammonium perchlorate and a small amount of a flow control agent in 240 parts of the solution of cohydrolyzate of γ-glycidoxypropyl trimethoxysilane, methyl trimethoxysilane and dimethyl dimethoxysilane.

The overcoating composition obtained as described above was applied to a polycarbonate substrate which had been covered in advance with an undercoat layer as in Example 1, and then dried and cured in hot-air furnace at 130° C. for 60 minutes. The coated shaped article of polycarbonate thus produced was transparent. The abrasion resistance was A, the adhesiveness was 100/100 and the hot water resistance and the heat resistance were both good. Even after the test for hot water resistance, the abrasion resistance was A and the adhesiveness was 100/100.

EXAMPLE 4

In 56.3 parts of iso-propyl alcohol, 98.9 parts of γ-glycidoxypropyl trimethoxysilane, 69.4 parts of tetraethoxysilane and 26.6 parts of methyl triethoxysilane were dissolved. In the resultant solution, 82.1 parts of an aqueous 0.05 N hydrochloric acid solution was gradually added and stirred at room temperature to effect hydrolysis. Thereafter, the reaction mixture was left standing at room temperature for more than 20 hours to be fully aged. The resultant solution was colorless and transparent and was found to contain 21.0% of γ-glycidoxypropyl trimethoxysilane hydrolyzate calculated as

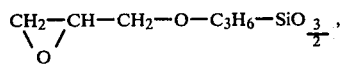

6.0% of tetraethoxysilane hydrolyzate calculated as $SiO_2$, and 3.0% of methyl triethoxysilane hydrolyzate calculated as $CH_3SiO_{3/2}$. An overcoating composition was obtained by dissolving 50 parts of ethyl cellosolve, 0.6 part of ammonium perchlorate and a small amount of a flow control agent in 250 parts of the solution of cohydrolyzate of γ-glycidoxypropyl trimethoxysilane, tetraethoxysilane and methyl triethoxysilane obtained as described above.

This overcoating composition was applied to a polycarbonate substrate which had been covered with an undercoat layer as in Example 1, and then was dried and cured in a hot-air furnace at 110° C. for 90 minutes. The coated shaped article of polycarbonate thus obtained was transparent. The abrasion resistance was A and the adhesiveness was 100/100. Even after the test for hot water resistance, the article retained its appearance intact.

Control 1

This overcoating composition described in Example 1 was applied to a polycarbonate substrate which had been cleaned and had not been covered with any undercoat. The overcoat thus formed was dried and cured in a hot-air furnace at 130° C. for 90 minutes. The cured overcoat did not adhere at all to the surface of the polycarbonate substrate and remained as a separate film.

EXAMPLE 5

γ-Glycidoxypropyl trimethoxysilane (236 parts) and 280 parts of vinyl-tris(β-methoxyethoxy)silane were mixed. In the resultant mixture, 160 parts of an aqueous 0.05 N hydrochloric acid solution was gradually added and stirred at room temperature to effect hydrolysis. The resultant mixture was left standing at room temperature for more than 20 hours to be fully aged. The solution thus obtained was light yellow and transparent and was found to contain 24.6% of γ-glycidoxypropyl trimethoxysilane hydrolyzate calculated as

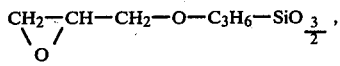

and 11.7% of vinyl-tris(β-methoxyethoxy)silane hydrolyzate calculated as $CH=CH-Si-O_{3/2}$. An overcoating composition was obtained by dissolving 67.8 parts of ethyl cellosolve, 0.54 part of ammonium perchlorate and a small amount of a flow control agent in 150 parts of the solution of cohydrolyzate of γ-glycidoxypropyl trimethoxysilane and vinyl-tris(β-methoxyethoxy)silane obtained as described above.

This overcoating composition was applied to a polycarbonate substrate which had been covered with an undercoat as in Example 1, and the overcoat was dried and cured in a hot-air furnace at 130° C. for 60 minutes to be fully aged. The resultant coated shaped article of polycarbonate thus obtained was transparent. The abrasion resistance was A. After the test for hot water resistance, the article retained its appearance intact and exhibited and adhesiveness of 100/100.

EXAMPLE 6

In 76.0 parts of iso-propyl alcohol, 91.8 parts of γ-glycidoxypropyl trimethoxysilane and 68.9 parts of γ-mercaptopropyl trimethoxysilane were dissolved. In the resultant solution, 49.0 parts of an aqueous 0.05 N hydrochloric acid solution was gradually added and stirred at room temperature to effect hydrolysis. Thereafter, the resultant mixture was left standing at room temperature for more than 20 hours to be fully aged. The solution thus obtained was colorless and transparent and found to contain 22.8% of γ-glycidoxypropyl trimethoxysilane hydrolyzate calculated as

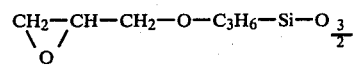

and 12.3% of γ-mercaptopropyl trimethoxysilane hydrolyzate calculated as $HS-C_3H_6-SiO_{3/2}$. An overcoating composition was prepared by dissolving 40.4 parts of ethyl cellosolve, 0.18 part of ammonium perchlorate and a small amount of a flow control agent in 100 parts of the solution of cohydrolyzate of γ-glycidoxypropyl trimethoxysilane and γ-mercaptopropyl trimethoxysilane obtained as described above.

This overcoating composition was applied to a polycarbonate substrate which had been covered with an undercoat as in Example 1, and the overcoat was dried and cured in a hot-air furnace at 130° C. for 60 minutes to be cured. The coated shaped article of polycarbonate thus obtained was transparent and exhibited high abrasion resistance, hot water resistance and adhesiveness.

EXAMPLE 7

In 80.0 parts of iso-propyl alcohol, 111.1 parts of β-(3,4-epoxycyclohexyl)ethyl trimethoxysilane and 40.6 parts of methyl trimethoxysilane were dissolved. In the resultant solution, 54.0 parts of an aqueous 0.01 N hydrochloric acid solution was gradually added and stirred at room temperature to effect hydrolysis. Thereafter, the resultant reaction mixture was left standing at room temperature for more than 20 hours to be fully aged. The solution thus produced was colorless and transparent and was found to contain 28.0% of β-(3,4-epoxycyclohexyl)ethyl trimethoxysilane hydrolyzate calculated as

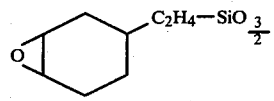

and 7.0% of methyl trimethoxysilane hydrolyzate calculated as $CH_3-Si-O_{3/2}$. An overcoating composition was prepared by dissolving 40.0 parts of ethyl cellosolve, 0.18 part of ammonium perchlorate and a small amount of a flow control agent in 100 parts of the solution of cohydrolyzate of β-(3,4-epoxycyclohexyl)ethyl trimethoxysilane and methyl trimethoxysilane obtained as described above.

This overcoating composition was applied to a polycarbonate substrate which had been covered with an undercoat as in Example 1, and the overcoat was dried and cured at 130° C. for 60 minutes. The dried shaped article of polycarbonate thus obtained was transparent. The abrasion resistance was A, the adhesiveness was 100/100 and the hot water resistance and the heat resistance were both good. After the test for hot water resistance, the abrasion resistance and the adhesiveness were A and 100/100 respectively. In all the chemicals, the article exhibited high resistance and retained its good appearance intact.

Control 2

A coating composition containing γ-glycidoxypropyl trimethoxysilane and γ-chloropropyl trimethoxysilane which had not been hydrolyzed in advance was prepared as follows. In 102.9 parts of ethyl cellosolve, 70.6 parts of γ-glycidoxypropyl trimethoxysilane and 76.5 parts of γ-chloropropyl trimethoxysilane were dissolved. An overcoating composition was obtained by dissolving 0.8 part of ammonium perchlorate and a small amount of a flow control agent in the resultant solution.

This overcoating composition was applied to a polycarbonate substrate which had been covered in advance with an undercoat as in Example 1, and the overcoat was dried and cured in a hot-air furnace at 130° C. for 60 minutes. The coat thus produced was in a flushed condition. The abrasion resistance of the coat was rated as B.

EXAMPLE 8

In 320 parts of ethyl cellosolve, 36 parts of 2-hydroxyethyl methacrylate, 14 parts of dimethylaminoethyl methacrylate, 50 parts of methyl methacrylate and 0.4 part of azo-bis-isobutyronitrile were dissolved. The resultant solution was stirred under an atmosphere of nitrogen gas at 90° C. for 4 hours to effect copolymerization. An undercoating composition (b) was prepared by adding 1.3 parts of hexakismethoxymethyl melamine, 0.18 part of ammonium chloride, 900 parts of ethyl cellosolve and a small amount of a flow control agent to 100 parts of the solution obtained above. This undercoating composition (b) was applied to a polycarbonate substrate which had been cleaned in advance, and the undercoat was dried in a hot-air furnace at 130° C. for 20 minutes. Then, the overcoating composition of Example 1 was applied to the undercoated polycarbonate substrate, and the overcoat was dried and cured in the hot-air furnace at 130° C. for 60 minutes. The overcoat layer thus obtained exhibited good adhesiveness to the substrate. Before and after the test for hot water resistance, the adhesiveness was invariably 100/100.

EXAMPLE 9

The overcoating composition prepared in Example 1 was left standing at room temperature for one month. After the standing, it was applied to a polycarbonate substrate which had been covered in advance with an undercoat as in Example 1, and the overcoat was dried and cured in a hot-air furnace at 130° C. for 90 minutes. The overcoat thus obtained exhibited satisfactory properties equalling the properties of the overcoat obtained in Example 1.

Control 3

An overcoating composition was prepared by using the same ingredients of the overcoating composition as those of Example 1 except for omission of ammonium perchlorate used as a curing catalyst. It was left standing at room temperature for 30 hours. After the standing, it was applied to a polycarbonate substrate which had been covered with an undercoat as in Example 1, and the overcoat was dried and cured in a hot-air furnace at 130° C. for 90 minutes. The overcoat thus obtained was transparent. The abrasion resistance of this overcoat was rated as C.

EXAMPLE 10

In 68.4 parts of iso-propyl alcohol, 100.0 parts of γ-glycidoxypropyl trimethoxysilane was dissolved. In the resultant solution, 34.2 parts of an aqueous 0.1 N hydrochloric acid solution was gradually added and stirred at room temperature to effect hydrolysis. Thereafter, the reaction mixture was left standing at room temperature for more than 20 hours to be fully aged. The resultant solution was colorless and transparent and was found to contain 35% of γ-glycidoxypropyl trimethoxysilane hydrolyzate calculated as

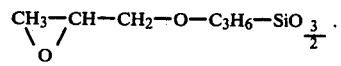

An overcoating composition was prepared by adding 42 parts of colloidal silica (having a solids content of 20%, produced by Nissan Chemical Industry Co., Ltd., and marketed under trademark designation of "Snowtex-C"), 10.1 parts of ethyl cellosolve, 0.28 part of ammonium perchlorate, and a small amount of a flow control agent to 56 parts of the solution of γ-glycidoxypropyl trimethoxysilane hydrolyzate obtained as described above.

This overcoating composition was applied to a polycarbonate substrate which had been covered with an undercoat as in Example 1, and the overcoat was dried and cured in a hot-air furnace at 130° C. for 60 minutes. The coated shaped article of polycarbonate thus obtained was transparent. The abrasion resistance was A, the adhesiveness was 100/100, and the hot water resistance and the heat resistance were both good. Even after the test for hot water resistance, the abrasion resistance and the adhesiveness were A and 100/100 respectively.

The system of the present example which used γ-glycidoxypropyl trimethoxysilane, one member of the group of components (A), and colloidal silica, one member of the group of components (A), exhibited decidedly better appearance and rigidity after 500 hours of a sunshine weather meter test than a system which used the component (A) alone.

EXAMPLE 11

An overcoating composition was prepared by adding 66.7 parts of colloidal silica (having a solids content of 30%, made by Shokubai Kasei Industry Co., Ltd. and marketed under trademark designation of "Organosol"), 43.1 parts of ethyl cellosolve, 0.25 part of ammonium perchlorate and a small amount of a flow control agent to 85.7 parts of the solution of γ-glycidoxypropyl trimethoxysilane hydrolyzate obtained in Example 10. This overcoating composition was applied to a polycarbonate substrate which had been covered with an undercoat in advance as in Example 8, and the overcoat was dried and cured in a hot-air furnace at 130° C. for 60 minutes. The coated shaped article of polycarbonate thus obtained was transparent. The abrasion resistance was A, the adhesiveness was 100/100, and the hot water resistance, the heat resistance and the chemical resistance were all good. After these tests, the product retained its good appearance intact.

EXAMPLE 12

An overcoating composition and an undercoating composition were prepared as follows:

(1) Preparation of overcoating composition

Eighty (80) parts of γ-glycidoxypropyl trimethoxysilane, 144 parts of methyl trimethoxysilane, 71 parts of colloidal silica (having a solids content of 20%, made by Nissan Chemical Industry Co., Ltd., and marketed under trademark designation of "Snowtex-C") and 170 parts of an aqueous 0.1 N hydrochloric acid solution were mixed and refluxed at 80° to 85° C. for 2 hours to effect hydrolysis. The resultant solution was found to contain 12.2% of γ-glycidoxypropyl trimethoxysilane hydrolyzate calculated as

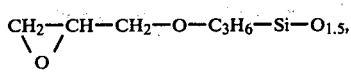

15.3% of methyltrimethoxysilane hydrolyzate calculated as $CH_3SiO_{1.5}$, and 3.1% of colloidal silica calculated as $SiO_2$. An overcoating composition was obtained by adding 73 parts of ethyl cellosolve, 1.3 parts of ammonium perchlorate and a small amount of a flow control agent to 410 parts of the solution of three-component cohydrolyzate obtained as described above.

(2) Preparation of undercoating composition

In 230 parts of ethyl cellosolve, 30 parts of 2-hydroxyethyl methacrylate, 70 parts of glycidyl methacrylate and 0.4 part of azo-bis-isobutyronitrile were dissolved and stirred in an atmosphere of nitrogen gas at 90° C. for 4 hours to effect copolymerization. An undercoating composition (C) was obtained by adding 9 parts of the solution of 2-hydroxyethyl methacrylate and dimethylaminoethyl methacrylate obtained during the preparation of the undercoating composition of Example 1, 520 parts of ethyl cellosolve and a small amount of a flow control agent to 52 parts of the solution obtained as described above.

The undercoating composition (C) prepared in (2) above was applied to a polycarbonate substrate which had been cleaned in advance, and the undercoat thus formed was dried and cured in a hot-air furnace at 130° C. for 10 minutes. Then, the overcoating composition prepared in (1) above was applied to the polycarbonate substrate which had been covered in advance with an undercoat as described above, and the overcoat was dried and cured in the hot-air furnace at 130° C. for 60 minutes. The coated shaped article of polycarbonate thus obtained was transparent. The abrasion resistance was A, the adhesiveness was 100/100 and the heat resistance was good. Even after the test for hot water resistance, the abrasion resistance and the adhesiveness were A and 100/100 respectively. After 500 hours of a sunshine weather meter test, the product exhibited very good appearance and rigidity. To all the chemicals, the product exhibited high resistance. After the test for chemical resistance it retained its good appearance intact.

EXAMPLE 13

Sixty (60) parts of γ-glycidoxypropyl trimethoxysilane, 173 parts of methyl trimethoxysilane, 71 parts of colloidal silica (having a solids content of 20%, made by Nissan Chemical Industry Co., Ltd., and marketed under trademark designation of "Snowtex-C") and 190 parts of an aqueous 0.1 N hydrochloric acid solution were mixed and refluxed at 80° to 85° C. for 2 hours to effect hydrolysis. The resultant solution contained 8.6% of γ-glycidoxypropyl trimethoxysilane hydrolyzate calculated as

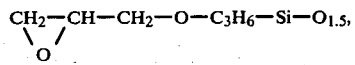

17.3% of methyl trimethoxysilane hydrolyzate calculated as $CH_3SiO_{1.5}$ and 2.9% of colloidal silica calculated as $SiO_2$.

An overcoating composition was obtained by adding 47 parts of ethyl cellosolve, 1.3 parts of ammonium perchlorate and a small amount of a flow control agent to 436 parts of the three-component cohydrolyzate solution obtained as described above. This overcoating composition was applied to a polycarbonate substrate which had been covered in advance with an undercoat as in Example 12, and the overcoat was dried and cured in a hot-air furnace at 130° C. for 60 minutes.

The coated shaped article of polycarbonate thus obtained was transparent. The hot water resistance and the heat resistance were both good. Even after the test for hot water resistance, the abrasion resistance and the adhesiveness were A and 100/100 respectively. After 500 hours of a sunshine weather meter test, the product exhibited very good appearance and rigidity.

EXAMPLE 14

Forty (40) parts of γ-glycidoxypropyl trimethoxysilane, 202 parts of methyl trimethoxysilane, 71 parts of colloidal silica (having a solids content of 20%, made by Nissan Chemical Industry Co., Ltd. and marketed under trademark designation of "Snowtex'C") and 211 parts of an aqueous 0.1 N hydrochloric acid solution were mixed and fluxed at 80° to 85° C. for 1 hour to effect hydrolysis. The resultant solution contained 5.4% of γ-glycidoxypropyl trimethoxysilane hydrolyzate calculated as

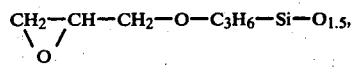

19.0% of methyl trimethoxysilane hydrolyzate calculated as $CH_3SiO_{1.5}$ and 2.7% of colloidal silica calculated as $SiO_2$.

An overcoating composition was obtained by adding 20 parts of ethyl cellosolve, 1.3 parts of ammonium perchlorate and a small amount of a flow control agent to 463 parts of the solution of three-component cohydrolyzate obtained as described above. This overcoating composition was applied to a polycarbonate substrate which had been covered with an undercoat as in Example 12, and the overcoat was dried and cured in a hot-air furnace at 120° C. for 60 minutes. The coated shaped article of polycarbonate thus obtained was transparent. The abrasion resistance was A, the adhesiveness was 100/100 and the hot water resistance and the heat resistance were both good. Even after the test for hot water resistance, the abrasion resistance and the adhesiveness were A and 100/100 respectively. The product exhibited its good appearance and rigidity intact even after 500 hours of a sunshine weather meter test.

EXAMPLE 15

Sixty (60) parts of γ-glycidoxypropyl trimethoxysilane, 144 parts of methyl trimethoxysilane, 142 parts of colloidal silica (having a solids content of 20%, made by Nissan Chemical Industry Co., Ltd. and marketed under trademark designation of "Snowtex-C") and 98 parts of an aqueous 0.1 N hydrochloric acid solution were mixed and refluxed at 80° to 85° C. for 2 hours to effect hydrolysis. The resultant solution contained 9.6% of γ-glycidoxypropyl trimethoxysilane hydrolyzate calculated as

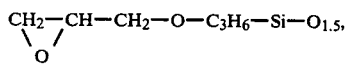

16.0% of methyl trimethoxysilane hydrolyzate calculated as $CH_3SiO_{1.5}$ and 6.4% of colloidal silica calculated as $SiO_2$.

An overcoating composition was obtained by adding 66 parts of ethyl cellosolve, 1.3 parts of ammonium perchlorate and a small amount of a flow control agent to 417 parts of the solution of three-component cohydrolyzate obtained as described above. This overcoating composition was applied to a polycarbonate substrate which had been covered in advance with an undercoat as in Example 1, and the overcoat was dried and cured in a hot-air furnace at 120° C. for 60 minutes. The coated shaped article of polycarbonate thus obtained was transparent. The abrasion resistance was A, the adhesiveness was 100/100 and the hot water resistance and the heat resistance were both good. Even after the test for hot water resistance, the abrasion resistance and the adhesiveness were A and 100/100 respectively. The product exhibited its good appearance and rigidity intact even after 500 hours of a sunshine weather meter test.

EXAMPLE 16

To 77 parts of iso-propyl alcohol were added 60 parts of γ-glycidoxypropyl trimethoxysilane, 115 parts of methyl trimethoxysilane, 213 parts of colloidal silica (having a solids content of 20%, made by Nissan Chemical Industry Co., Ltd. and marketed under trademark designation of "Snowtex-C") and 5 parts of an aqueous 1N hydrochloric acid solution. The mixture was refluxed at 80° C. to 85° C. for 2 hours. The resultant solution contained 9.1% of γ-glycidoxypropyl trimethoxysilane hydrolyzate calculated as

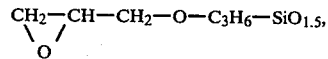

12.1% of methyl trimethoxysilane hydrolyzate calculated as $CH_3SiO_{1.5}$ and 9.1% of colloidal silica calculated as $SiO_2$.

An overcoating composition was obtained by adding 66 parts of ethyl cellosolve, 1.3 parts of ammonium perchlorate and a small amount of a flow control agent to 417 parts of the solution of three-component cohydrolyzate obtained as described above. This overcoating composition was applied to a polycarbonate substrate which had been covered in advance with an undercoat as in Example 1, and the overcoat was dried and cured in a hot-air furnace at 120° C. for 60 minutes. The coated shaped article of polycarbonate thus obtained was transparent. The abrasion resistance was A, the adhesiveness was 100/100 and the hot water resistance and the heat resistance were both good. Even after the test for hot water resistance, the abrasion resistance and the adhesiveness were A and 100/100 respectively. The product exhibited its good appearance and rigidity intact even after 500 hours of a sunshine weather meter test.

EXAMPLE 17

A mixture of 39 parts of γ-glycidoxypropyl trimethoxysilane, 2.9 parts of 3,3,3-trifluoropropyl trimethoxysilane, 110 parts of methyl trimethoxysilane, 75 parts of colloidal silica (having a solids content of 20%, made by Nissan Chemical Industry Co., Ltd. and marketed under trademark designation of "Snowtex-C") and 100 parts of an aqueous 0.1 N hydrochloric acid solution was refluxed at 80° to 85° C. for 2 hours. The resultant solution contained 8.5% of γ-glycidoxypropyl trimethoxysilane hydrolyzate calculated as

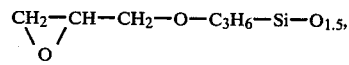

0.6% of 3,3,3-trifluoropropyl trimethoxysilane hydrolyzate calculated as $CF_3C_2H_4SiO_{1.5}$, 16.7% methyl trimethoxysilane hydrolyzate calculated as $CH_3SiO_{1.5}$ and 4.6% of colloidal silica calculated as $SiO_2$.

An overcoating composition was obtained by adding 49 parts of ethyl cellosolve, 0.9 part of ammonium perchlorate and a small amount of a flow control agent to 310 parts of the solution of four-component cohydrolyzate obtained as described above. This overcoating composition was applied to a polycarbonate substrate which had been covered in advance with an undercoat as in Example 12, and the overcoat was dried and cured in a hot-air furnace at 120° C. for 60 minutes. The coated shaped article of polycarbonate thus obtained was transparent. The abrasion resistance was A, the adhesiveness was 100/100 and the hot water resistance and the heat resistance were both good. Even after the test for hot water resistance, the abrasion resistance and the adhesiveness were A and 100/100 respectively. The product exhibited its good appearance and rigidity intact even after 500 hours of a sunshine weather meter test.

Control 4

Ten (10) parts of γ-glycidoxypropyl trimethoxysilane, 144 parts of methyl trimethoxysilane, 320 parts of colloidal silica (having a solids content of 20%, made by Nissan Chemical Industry Co., Ltd. and marketed under trademark designation of "Snowtex-C") and 6 parts of an aqueous 0.1 N hydrochloric acid solution were mixed and refluxed at 80° to 85° C. for 2 hours to effect hydrolysis. The resultant solution contained 1.5% of γ-glycidoxypropyl trimethoxysilane hydrolyzate calculated as

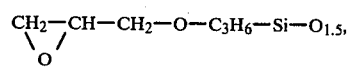

14.8% of methyl trimethoxysilane hydrolyzate calculated as $CH_3SiO_{1.5}$ and 13.3% of collidal silica calculated as SiO$_2$. Two kinds of overcoating composition were obtained by adding 82 parts of ethyl cellosolve, a small amount of a flow control agent, and 1.3 parts of ammonium perchlorate or 0.8 part of sodium acetate as a curing catalyst to 400 parts of the solution of three-component cohydrolyzate obtained as described above. This overcoating composition was applied to a polycarbonate substrate which had been covered in advance with an undercoat as in Example 12, and the overcoat was dried and cured in a hot-air furnace at 130° C. for 60 minutes. The coated shaped articles of polycarbonate thus obtained were excellent in rigidity but were deficient in adhesiveness. After the test for hot water resistance, the overcoats peeled off the substrates.

EXAMPLE 18

A mixture of 944.4 parts of γ-glycidoxypropyl trimethoxysilane, 835.2 parts of colloidal silica (having a solids content of 20%, made by Nissan Chemical Industry Co., Ltd. and marketed under trademark designation of "Snowtex-C") and 8.0 parts of an aqueous 1.2 N hydroxhloric acid solution was refluxed at 80° C. for 5 hours. From the resultant solution, 168 parts of the solvent was expelled through fractional distillation at 80° to 90° C. The resultant solution contained 41% of γ-glycidoxypropyl trimethoxysilane hydrolyzate calculated as

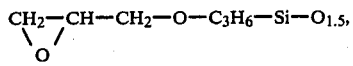

and 10% of colloidal silica calculated as SiO$_2$. An overcoating composition was obtained by adding 149 parts of ethyl cellosolve, 0.75 part of ammonium perchlorate and a small amount of a flow control agent to 141.0 parts of the solution of γ-glycidoxypropyl trimethoxysilane containing colloidal silica obtained as described above. This overcoating composition was applied to a polycarbonate substrate which had been covered in advance with an undercoat as in Example 12, and the overcoat was dried and cured in a hot-air furnace at 120° C. for 1 hour. The coated shaped article of polycarbonate thus obtained was dyed by a method indicated below.

The dyeing of the product was accomplished by preparing a dye bath containing an ordinary disperse dye, a dispersant, a pH adjusting agent, etc. in water and keeping the product in the dye bath at 85° to 95° C. for 20 minutes. The dyed product has a good appearance. The percent transmission to visible ray was 65%, the abrasion resistance was A, the adhesiveness was 100/100 and the hot water resistance was also good. The fastness of dye was satisfactory.

EXAMPLE 19

An overcoating composition was obtained by adding 7.6 parts of tetrabutoxy titanium, 39.4 parts of ethyl cellosolve, 0.18 part of ammonium perchlorate and a small amount of a flow control agent to 100.0 parts of the solution of γ-glycidoxypropyl trimethoxysilane hydrolyzate prepared in Example 10.

This overcoating composition was applied to a polycarbonate substrate which had been covered in advance with an undercoat as in Example 8, and the overcoat was dried and cured in a hot-air furnace at 130° C. for 60 minutes. The coated shaped article of polycarbonate was transparent. The abrasion resistance was A, the adhesiveness was 100/100 and the hot water resistance was also good.

EXAMPLE 20

An overcoating composition was obtained by adding 20 parts of butoxy titanium polymer (having a purity exceeding 95%, made by Nippon Soda Co., Ltd. and marketed under trademark designation of "TBT-200"), 24.1 parts of ethyl cellosolver, 0.28 part of ammonium perchlorate and a small amount of a flow control agent to 64 parts of the solution of γ-glycidoxypropyl trimethoxysilane hydrolyzate prepared in Example 10. This overcoating composition was applied to a polycarbonate substrate which had been covered in advance with an undercoat as in Example 8, and the overcoat was dried and cured in a hot-air furnace at 130° C. for 60 minutes. The coated shaped article of polycarbonate thus obtained was transparent. The abrasion resistance was A, the adhesiveness was 100/100, and the hot water resistance was also good.

EXAMPLE 21

To 120 parts of γ-glycidoxypropyl trimethoxysilane, 9.4 parts of titanium polymer (made by Nippon Soda Co., Ltd. and marketed under trademark designation of "TBT-400") was added while under stirring. In the resultant solution, 27 parts of an aqueous 0.1 N hydrochloric acid solution was gradually added and stirred at room temperature for 3 hours to effect hydrolysis. An overcoating composition was obtained by adding 184 parts of ethyl cellosolve, 0.8 part of ammonium perchlorate and a small amount of a flow control agent to 140 parts of the light yellow transparent solution obtained as described above. This overcoating composition was applied to a polycarbonate substrate which had been covered in advance with an undercoat as in Example 1, and the overcoat was dried and cured in a hot-air furnace at 130° C. for 1 hour. The coated shaped article of polycarbonate thus obtained was dyed by the same method as in Example 18. The dyed product had a good appearance. The percent transmission to visible ray was 70%, the abrasion resistance was A, the adhesiveness was 100/100, and the hot water resistance and the dye fastness were both good.

EXAMPLE 22

As shown in Table 1, copolymers and homopolymers were produced by using comonomers and monomers and solvents and initiators. Then by adding cross-linking agents, curing catalysts and solvents to the copolymers and homopolymers as shown in Table 2, to produce undercoating compositions (d) through (n).

These undercoating compositions (d) through (n) were applied each to a polycarbonate substrate which had been cleaned in advance, and the undercoats were dried and cured in a hot-air furnace at 130° C. for 20 minutes.

TABLE 1

| | Synthesis of copolymer or homopolymer | | | | |
|---|---|---|---|---|---|
| | Comonomer or monomer | | | | |
| Polymer | Name | Parts by weight | Name | Parts of weight | Name | Parts by weight |
| d | 2-hydroxyethyl methacry- | 36 | dimethylaminoethyl methacrylate | 44 | — | — |

TABLE 1-continued

| | Monomer 1 | Parts | Monomer 2 | Parts | Monomer 3 | Parts | Monomer 4 | Parts |
|---|---|---|---|---|---|---|---|---|
| e | 2-hydroxyethyl methacrylate | 20 | dimethylaminoethyl methacrylate | 20 | methyl methacrylate | 60 | — | — |
| f | 2-hydroxyethyl methacrylate | 51.5 | acrylic acid | 28.5 | — | — | — | — |
| g | 2-hydroxyethyl methacrylate | 38 | glycidyl methacrylate | 42 | — | — | — | — |
| h | 2-hydroxyethyl methacrylate | 51.7 | acrylamide | 28.3 | — | — | — | — |
| i | 2-hydroxyethyl methacrylate | 45 | N—methylol acrylamide | 35 | — | — | — | — |
| j | 2-hydroxyethyl methacrylate | 40 | tetrahydrofurfuryl methacrylate | 52 | — | — | — | — |
| k | arylamide | 20 | tetrahydrofurfuryl methacrylate | 50 | — | — | — | — |
| l | arylamide | 50 | — | — | — | — | — | — |
| m | acrylic acid | 20 | — | — | — | — | — | — |
| n | glycidyl methacrylate | 8 | methyl methacrylate | 72 | — | — | — | — |

Synthesis of copolymer or homopolymer

| | Solvent | | Initiator | | Polymerization conditions | |
|---|---|---|---|---|---|---|
| Polymer | Name | Parts by weight | Name | parts by weight | Temperature (°C.) | Time (hr) |
| d | ethyl-cellosolve | 320 | azo-bis-isobutylonitrile | 0.4 | 90 | 2 |
| e | ethyl-cellosolve | 320 | azo-bis-isobutylonitrile | 0.4 | 90 | 2 |
| f | ethyl-cellosolve | 320 | azo-bis-isobutylonitrile | 0.4 | 90 | 2 |
| g | ethyl-cellosolve | 320 | azo-bis-isobutylonitrile | 0.4 | 90 | 4 |
| h | ethyl-cellosolve / water | 220 / 100 | azo-bis-isobutylonitrile | 0.4 | 80 | 6 |
| i | ethyl-cellosolve | 320 | azo-bis-isobutylonitrile | 0.4 | 80 | 6 |
| j | ethyl-cellosolve | 360 | azo-bis-isobutylonitrile | 0.5 | 80 | 2 |
| k | ethyl-cellosolve / water | 230 / 100 | azo-bis-isobutylonitrile | 0.4 | 90 | 2 |
| l | water | 200 | ammonium persulphate | 0.5 | 80 | 2 |
| m | water | 200 | ammonium peroxide | 0.5 | 90 | 2 |
| n | ethyl-cellosolve | 320 | azo-bis-isobutylonitrile | 0.4 | 90 | 2 |

TABLE 2

Preparation of undercoating composition

| Undercoating composition | Copolymer or homopolymer Name | Parts by weight | Cross-linking agent Name | Parts by weight | Curing aid Name | Parts by weight | Solvent Name | Parts by weight |
|---|---|---|---|---|---|---|---|---|
| d | d | 100 | hexa(methoxymethyl)melamine | 1.4 | NH$_4$ClO$_4$ | 0.19 | ethyl-cellosolve | 900 |
| e | e | 100 | hexa(methoxymethyl)melamine | 0.7 | " | 0.10 | ethyl-cellosolve | 900 |
| f | f | 100 | hexa(methoxymethyl)melamine | 1.9 | " | 0.27 | ethyl-cellosolve | 900 |
| g | g | 100 | hexa(methoxymethyl)melamine | 1.4 | " | 0.20 | ethyl-cellosolve | 900 |
| h | h | 100 | hexa(methoxymethyl)melamine | 1.9 | NH$_4$Cl | 0.27 | ethyl-cellosolve / water | 675 / 225 |
| i | i | 100 | hexa(methoxymethyl)melamine | 1.7 | " | 0.24 | ethyl-cellosolve | 900 |
| j | j | 100 | hexa(methoxymethyl)melamine | 1.3 | " | 0.18 | ethyl-cellosolve | 900 |
| k | k | 100 | hexa(methoxymethyl)melamine | 1.4 | " | 0.20 | ethyl-cellosolve / water | 675 / 225 |
| l | l | 100 | hexa(methoxymethyl) | 2.0 | " | 0.08 | ethyl-cellosolve | 300 |

TABLE 2

Preparation of undercoating composition

| Undercoating composition | Copolymer or homopolymer Name | Parts by weight | Cross-linking agent Name | Parts by weight | Curing aid Name | Parts by weight | Solvent Name | Parts by weight |
|---|---|---|---|---|---|---|---|---|
| d | d | 100 | hexa(methoxy metlyl) melamine | 1.4 | NH₄ClO₄ | 0.19 | ethyl-cellosolve | 900 |
| e | e | 100 | hexa(methoxy metlyl) melamine | 0.7 | " | 0.10 | ethyl-cellosolve | 900 |
| f | f | 100 | hexa(methoxy metlyl) melamine | 1.9 | " | 0.27 | ethyl-cellosolve | 900 |
| g | g | 100 | hexa(methoxy metlyl) melamine | 1.4 | " | 0.20 | ethyl-cellosolve | 900 |
| h | h | 100 | hexa(methoxy metlyl) melamine | 1.9 | NH₄Cl | 0.27 | ethyl-cellosolve water | 675 225 |
| i | i | 100 | hexa(methoxy metlyl) melamine | 1.7 | " | 0.24 | ethyl-cellosolve | 900 |
| j | j | 100 | hexa(methoxy metlyl) melamine | 1.3 | " | 0.18 | ethyl-cellosolve | 900 |
| k | k | 100 | hexa(methoxy metlyl) melamine | 1.4 | " | 0.20 | ethyl-cellosolve water | 675 225 |
| l | l | 100 | hexa(methoxy metlyl) melamine | 2.0 | " | 0.08 | ethyl-cellosolve water | 300 600 |
| m | m | 100 | hexa(methoxy metlyl) melamine | 1.0 | " | 0.05 | ethyl-cellosolve water | 150 300 |
| n | n | 100 | — | — | — | — | toluene butyl-cellosolve | 22 88 |

The overcoating composition of Example 2 and that of Example 12 were each applied to the polycarbonate substrates which had been covered in advance with the undercoating composition (d) through (n) mentioned above. The overcoats thus formed were dried and cured at 130° C. for 60 minutes. The coated products thus obtained invariably exhibited adhesiveness of 100/100 before and after the test for hot water resistance.

EXAMPLE 23

The undercoating composition (a) indicated in Example 1 was applied to a polycarbonate substrate which had been cleaned in advance, and the overcoat was dried in a hot-air furnace at 130° C. for 20 minutes.

An overcoating composition prepared by repeating the procedure of Example 13 except for 1.3 parts of ammonium nitrate used in the place of ammonium perchlorate was applied to the polycarbonate substrate which had been covered with an undercoat obtained as described above, and the overcoat was dried and cured in a hot-air furnace at 130° C. for 5 hours. The coated shaped article of polycarbonate thus obtained was transparent. The abrasion resistance was intermediate between A and B, the adhesiveness was 100/100 and the hot water resistance and the heat resistance were both good. Even after the test for hot water resistance, the abrasion resistance was still intermediate between A and B and the adhesiveness was 100/100. To all the chemicals, the product exhibited high resistance. After the test for chemical resistance, the product retained its good appearance intact.

What is claimed is:

1. A coated shaped article of a polycarbonate type resin possessed of improved abrasion resistance, which comprises:
(I) a shaped substrate of a polycarbonate type resin,
(II) an undercoat layer formed on said substrate in a thickness of at least about 0.1 micron, which undercoat is formed of a composition containing a polymer selected from the group consisting of:
(i) a polymer having repeating structural units represented by the general formula (3):

(3)

wherein, $R^6$ and $R^7$ independently stand for a hydrogen atom or an alkyl group of 1 to 5 carbon atoms or carboxyl group and X for a side chain containing carboxyl group, amino group or epoxy group, and
(ii) a polymer having repeating structural units represented by the general formula (4):

(4)

wherein, $R^8$ and $R^9$ indepedently stand for a hydrogen atom or a lower alkyl group of 1 to 5 carbon atoms or carboxyl group and Y for a side chain containing a hydroxyl group and repeating structural units represented by the general formula (5):

(5)

wherein, $R^{10}$ and $R^{11}$ independently stand for a hydrogen atom or a lower alkyl group or carboxyl group and Z for a side chain containing a carboxyl group, alkoxy-carbonyl group, amino group, substituted amino group, epoxy group or tetrahydro-furyl group, and
(III) an overcoat layer applied to and cured on said undercoat layer in a thickness of at least about 1 micron, which overcoat is formed of a composition containing: as component (A) at least one hydrolyzate selected from the group of epoxy group-containing silicon compounds represented by the general formula (1):

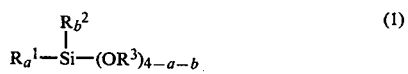
(1)

wherein, $R^1$ stands for an organic group containing an epoxy group, $R^2$ for a hydrogen atom, a hydrocarbon group of 1 to 6 carbon atoms, or vinyl group, $R^3$ for a hydrocarbon group of 1 to 5 carbon atoms, an alkoxy-alkyl group or an acyl group of 1 to 4 carbon atoms, a for an integer of 1 to 3 and b for an interger of 0 to 2, providing that $a+b \leq 3$ is satisfied; as component (B) at least one member selected from the group consisting of hydrolyzates of organic silicon compounds represented by the general formula (2):

$$R_c^4-Si-(OR^5)_{4-c} \quad (2)$$

wherein, $R^4$ stands for a hydrocarbon group of 1 to 6 carbon atoms, vinyl group, methacryloxy group, amino group, mercapto group or organic group containing fluorine or chlorine, $R^5$ for a hydrocarbon group of 1 to 5 carbon atoms, an alkoxy-alkyl group or acyl group of 1 to 4 carbon atoms, and c for an integer of 0 to 3, and b for an interger of 0 to 3, colloidal silica and organic titanium compounds; and as component (C) a curing catalyst, wherein component (A) is used in an amount of 100 parts by weight (of solids, calculated as

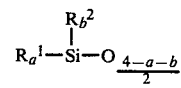

and component (B) is used in an amount falling within the range of from 1 to 567 parts by weight (of solids, calculated as

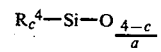

in the case of an organic silicon compound of the general formula (2), as $SiO_2$ in the case of colloidal silica, or as

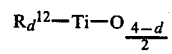

in the case of an organic titanium compound, wherein $R^{12}$ stands for an unhydrolyzed group containing no hydroxyl group and d for an integer of 1 to 4), said undercoating being of a thickness which promotes adhesion of the overcoating and said overcoating being of a thickness which gives satisfactory abrasion resistance and adhesion without cracking.

2. An article set forth in claim 1, wherein component (B) consists in the hydrolyzate of an organic silicon compound represented by the general formula (2) used in an amount within the range of from 56 to 550 parts by weight and the colloidal silica used in an amount within the range of from 4 to 334 parts by weight, providing that the total of the amounts of the members of (B) component falls within the range of from 60 to 567 parts by weight.

3. An article set forth in claim 1, wherein component (B) consists in at least one member selected from the group consisting of colloidal silica and organic titanium compounds used in an amount within the range of from 1 to 150 parts by weight, said overcoating composition being characterized by substantial absence of hydrolyzate of silicon compounds other than as specified in component (A).

4. An article set forth in claim 1, wherein component (B) consists in the hydrolyzate of an organic silicon compound represented by the general formula (2) used in an amount within the range of from 105 to 430 parts by weight and the colloidal silica used in an amount in the range of from 16 to 200 parts by weight, providing that the total of the amounts of the members of component (B) falls within the range of from 121 to 473 parts by weight.

5. An article set forth in claim 1, wherein component (B) consists in at least one member selected from the group consisting of colloidal silica and organic titanium compounds used in an amount within the range of from 3 to 70 parts by weight, said overcoating composition being characterized by substantial absence of hydrolyzate of silicon compounds other than as specified in component (A).

6. An article set forth in claim 1, wherein the curing catalyst is one member selected from the group consisting of perchlorates, hydrochlorides, sulfates, nitrates, carboxylates, higher aliphatic fluorosulfonates and higher aliphatic fluorosulfonylates.

7. An article set forth in claim 1, wherein the curing catalyst is an ammonium salt selected from the group consisting of ammonium perchlorate, ammonium chloride, ammonium sulfate and ammonium nitrate.

8. An article set forth in claim 1, wherein the curing catalyst is used in an amount within the range of from 0.05 to 10% by weight based on the total amount of the component (A) and the component (B) taken as solids.

9. An article set forth in claim 1, wherein the thickness of the overcoat layer is within the range of from 1 to 30 microns and that of the undercoat layer within the range of from 0.1 to 1 micron.

10. A process for producing a coated shaped article of a polycarbonate type resin possessed of improved abrasion resistance, which comprises:

coating a shaped substrate of a polycarbonate type resin with a composition containing a polymer selected from the group consisting of:

(i) a polymer having repeating structural units represented by the general formula (3):

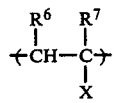
(3)

wherein, $R^6$ and $R^7$ independently stand for a hydrogen atom or an alkyl group or carboxyl group of 1 to 5 carbon atoms and x for a side chain containing carboxyl group, amino group or epoxy group, and (ii) a polymer having repeating structural units represented by the general formula (4):

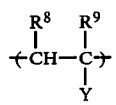
(4)

wherein, $R^8$ and $R^9$ independently stand for a hydrogen atom or a lower alkyl group of 1 to 5 carbon atoms or carboxyl group and Y for a side chain containing a hydroxyl group and repeating structural units represented by the general formula (5):

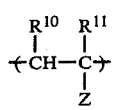
(5)

wherein, $R^{10}$ and $R^{11}$ independently stand for a hydrogen atom or a lower alkyl group or carboxyl group and Z for a side chain containing a carboxyl group, alkoxy-carbonyl group, amino group, substituted amino group, epoxy group or tetrahydrofuryl group, as an undercoat layer in a thickness of at least about 0.1 micron, and coating the thus undercoated substrate with a composition containing: as component (A) at least one hydrolyzate selected from the group of epoxy group-containing silicon compounds represented by the general formula (1):

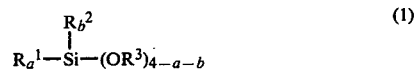
(1)

wherein, $R^1$ stands for an organic group containing an epoxy group, $R^2$ for a hydrogen atom or a hydrocarbon group of 1 to 6 carbon atoms, or vinyl group, $R^3$ for a hydrocarbon group of 1 to 5 carbon atoms, an alkoxyalkyl group or an acyl group of 1 to 4 carbon atoms, a for an integer of 1 to 3 and b for an integer of 0 to 2, providing that $a+b \leq 3$ is satisfied; as component (B) at least one member selected from the group consisting of hydrolyzates of organic silicon compounds represented by the general formula (2):

$$R_c^4-Si-(OR^5)_{4-c} \quad (2)$$

wherein, $R^4$ stands for a hydrocarbon group of 1 to 6 carbon atoms, vinyl group, methacryloxy group, amino group, mercapto group or organic group containing fluorine or chlorine, $R^5$ for a hydrocarbon group of 1 to 5 carbon atoms, an alkoxy-alkyl group or acyl group of 1 to 4 carbon atoms, and c for an integer of 0 to 3, colloidal silica and organic titanium compounds; and as component (C) a curing catalyst as an overcoat layer in a thickness of at least about 1 micron, and wherein component (A) is used in an amount of 100 parts by weight (of solids, calculated as

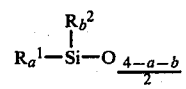

and component (B) is used in an amount falling within the range of from 1 to 567 parts by weight (of solids, calculated as

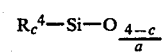

in the case of an organic silicon compound of the general formula (2), as $SiO_2$ in the case of colloidal silica, or as

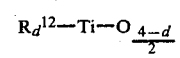

in the case of an organic titanium compound, wherein $R^{12}$ stands for an unhydrolyzed group containing no hydroxyl group and d for an integer of 1 to 4), said undercoating being of a thickness which promotes adhesion of the overcoating and said overcoating being of a thickness which gives satisfactory abrasion resistance and adhesion without cracking.

11. A process set forth in claim 10, wherein component(s) consists in the hydrolyzate of an organic silicon compound represented by the general formula (2) used in an amount within the range of from 56 to 550 parts by weight and the colloidal silica used in an amount within the range of from 4 to 334 parts by weight, providing that the total of the amounts of the members of component (B) falls within the range of from 60 to 567 parts by weight.

12. A process set forth in claim 11, wherein component (B) consists in at least one member selected from the group consisting of colloidal silica and organic titanium compounds used in an amount within the range of from 1 to 150 parts by weight, said overcoating composition being characterized by substantial absence of hydrolyzate of silicon compounds other than as specified in component (A).

13. A process set forth in claim 10, wherein component(B) consists in the hydrolyzate of an organic silicon compound represented by the general formula (2) used in an amount within the range of from 105 to 430 parts by weight and the colloidal silica used in an amount in the range of from 16 to 200 parts by weight, providing that the total of the amounts of the members of component (B) falls within the range of from 121 to 473 parts by weight.

14. A process set forth in claim 10, wherein component (B) consists in at least one member selected from the group consisting of colloidal silica and organic titanium compounds used in an amount within the range of from 3 to 70 parts by weight, said overcoating composition being characterized by substantial absence of hydrolyzate of silicon compounds other than as specified in component (A).

15. A process set forth in claim 10, wherein the curing catalyst is one member selected from the group consisting of perchlorates, hydrochlorides, sulfates, nitrates, carboxylates, higher aliphatic fluorosulfonates and higher aliphatic fluorosulfonylates.

16. A process set forth in claim 10, wherein the curing catalyst is an ammonium salt selected from the group consisting of ammonium perchlorate, ammonium chloride, ammonium sulfate and ammonium nitrate.

17. A process set forth in claim 10, wherein the curing catalyst is used in an amount within the range of from 0.05 to 10% by weight based on the total amount of the component (A) and the component (B) taken as solids.

18. An article set forth in claim 10, wherein the thickness of the overcoat layer is within the range of from 1 to 30 microns and that of the undercoat layer within the range of from 0.1 to 1 micron.

* * * * *

UNITED STATES PATENT AND TRADEMARK OFFICE
CERTIFICATE OF CORRECTION

PATENT NO. : 4,405,679

DATED : September 20, 1983

INVENTOR(S) : Akira Fujioka, Kazuo Sakiyama, Akio Takigawa and Motoaki Yoshida

It is certified that error appears in the above—identified patent and that said Letters Patent is hereby corrected as shown below:

Title page, [56] References Cited, U.S. PATENT DOCUMENTS, line 2, column 3; "Sanduig" should read -- Sandvig --

Col. 2, lines 21 & 22; in line 21, after the word "group" delete "or carboxyl group" and in line 22 insert after "atoms" the words -- or carboxyl group --

Col. 3, line 10; "hydrogen" should read -- hydrocarbon --

Col. 8, line 30; "form" should read -- from --

Col. 9, line 32; insert after "atom" the phrase -- or lower alkyl group of 1 to 5 carbon atoms or carboxyl group --

Col. 12, line 31; "cellophane" should read -- Cellophane --

Col. 27, Table 2 (second occurrence) delete the entire Table 2

Col. 30, lines 53 & 54; "(B) component" should read -- component (B) --

Col. 32, line 22; "alkoxyalkyl" should read -- alkoxy-alkyl --

Col. 33, line 5; "(s) should read -- (B) --

Col. 33, line 13; "11," should read -- 10, --

UNITED STATES PATENT AND TRADEMARK OFFICE
CERTIFICATE OF CORRECTION

PATENT NO. : 4,405,679

DATED : September 20, 1983

INVENTOR(S) : Akira Fujioka, Kazuo Sakiyama, Akio Takigawa and Motoaki Yoshida

It is certified that error appears in the above—identified patent and that said Letters Patent is hereby corrected as shown below:

Col. 1, line 46; "coloidal" should read -- colloidal --
Col. 1, line 66; delete "an"
Col. 10, line 16; "acrlate," should read -- acrylate, --
Col. 21, line 48; "IN" should read -- 1 N --
Col. 22, line 19; "relfuxed" should read -- refluxed --
Col. 23, line 22; "hydroxhloric" should read -- hydrochloric --
Col. 29, line 30; "indepedently" should read -- independently --
Col. 29, line 66; "interger" should read -- integer --
Col. 30, line 13; "interger" should read -- integer --
Col. 30, line 16; "delete "("
Col. 30, line 42; "delete ")"
Col. 32, line 42; delete "("
Col. 32, line 51; delete "("
Col. 32, line 67; delete ")"

Signed and Sealed this

Fifteenth Day of May 1984

[SEAL]

Attest:

GERALD J. MOSSINGHOFF

Attesting Officer

Commissioner of Patents and Trademarks